(12) United States Patent
Yoshida

(10) Patent No.: US 8,354,194 B2
(45) Date of Patent: Jan. 15, 2013

(54) NEGATIVE ELECTRODE ACTIVE MATERIAL, LITHIUM SECONDARY BATTERY USING THE SAME, AND METHOD OF MANUFACTURING NEGATIVE ELECTRODE ACTIVE MATERIAL

(75) Inventor: Jun Yoshida, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/863,198

(22) PCT Filed: Jan. 30, 2009

(86) PCT No.: PCT/IB2009/000184
§ 371 (c)(1),
(2), (4) Date: Jul. 16, 2010

(87) PCT Pub. No.: WO2009/095782
PCT Pub. Date: Aug. 6, 2009

(65) Prior Publication Data
US 2010/0310939 A1  Dec. 9, 2010

(30) Foreign Application Priority Data

Feb. 1, 2008 (JP) ................................. 2008-023061

(51) Int. Cl.
*H01M 4/58* (2010.01)
(52) U.S. Cl. .................................. 429/231.8; 252/182.1
(58) Field of Classification Search ............. 429/231.95, 429/231.8, 182.1; 252/182.1
See application file for complete search history.

(56) References Cited

U.S. PATENT DOCUMENTS

| | | | |
|---|---|---|---|
| 2004/0234859 A1 | 11/2004 | Lee et al. | |
| 2005/0084758 A1 | 4/2005 | Yamamoto et al. | |
| 2006/0115735 A1* | 6/2006 | Yasuda et al. | 429/233 |
| 2006/0234127 A1 | 10/2006 | Kim et al. | |
| 2007/0264574 A1 | 11/2007 | Kim et al. | |
| 2010/0092864 A1* | 4/2010 | Yokomizo et al. | 429/212 |
| 2010/0323241 A1* | 12/2010 | Kawakami et al. | 429/207 |

FOREIGN PATENT DOCUMENTS

| | | |
|---|---|---|
| CN | 1795573 A | 6/2006 |
| JP | A-10-3920 | 1/1998 |
| JP | A-2001-256968 | 9/2001 |
| JP | A-2003-151543 | 5/2003 |
| JP | A-2004-178922 | 6/2004 |
| JP | A-2004-200003 | 7/2004 |
| JP | A-2005-174603 | 6/2005 |
| JP | A-2005-340132 | 12/2005 |

(Continued)

OTHER PUBLICATIONS

Japanese Office Action dated Mar. 11, 2010 in Japanese Patent Application No. 2008-023061 (with translation).
International Search Report dated on Jun. 26, 2009 in International Application No. PCT/IB2009/000184.

(Continued)

*Primary Examiner* — Jennifer K Michener
*Assistant Examiner* — Monique Wills
(74) *Attorney, Agent, or Firm* — Oliff & Berridge, PLC

(57) ABSTRACT

A negative electrode active material characterized in that carbonaceous matter essentially consisting of carbon adheres to the surface of a tin particle essentially consisting of tin, with a mixture phase, in which tin and carbon are mixed, interposed between the carbonaceous matter and the tin particle.

11 Claims, 3 Drawing Sheets

FOREIGN PATENT DOCUMENTS

| | | |
|---|---|---|
| JP | A-2005-347076 | 12/2005 |
| JP | A-2006-100244 | 4/2006 |
| JP | A-2006-244984 | 9/2006 |
| JP | A-2006-525625 | 11/2006 |
| JP | A-2007-329001 | 12/2007 |
| WO | WO 2004/114439 A1 | 12/2004 |
| WO | WO 2007/049929 A1 | 5/2007 |
| WO | WO 2007/148553 A1 | 12/2007 |

OTHER PUBLICATIONS

International Preliminary Report on Patentability dated Feb. 10, 2010 in International Application No. PCT/IB2009/000184.
Written Opinion of the International Searching Authority dated Jun. 26, 2009 in International Application No. PCT/IB2009/000184.
Sep. 12, 2012 Office Action issued in Chinese Application No. 200980103632.8 with English-language translation.

* cited by examiner

NEGATIVE ELECTRODE ACTIVE MATERIAL, LITHIUM SECONDARY BATTERY USING THE SAME, AND METHOD OF MANUFACTURING NEGATIVE ELECTRODE ACTIVE MATERIAL

BACKGROUND OF THE INVENTION

1. Field of the Invention

The invention relates to a negative electrode active material for a lithium secondary battery that contains tin and carbon, a lithium secondary battery using the negative electrode active material, and a method of manufacturing the negative electrode active material.

2. Description of the Related Art

Carbon material, such as graphite, has been widely used as a negative electrode active material used in lithium secondary batteries. However, in general, the amount of Li that can be adsorbed by carbon material is small and therefore, focus is now put on Sn that adsorbs a larger amount of Li as compared to carbon material. Sn has the theoretical capacity of 994 mAh/g. Thus, Sn is relatively inexpensive material because, as compared to the practically used graphite that has the theoretical capacity of 372 mAh/g, Sn has relatively high theoretical capacity, that is, the theoretical capacity per unit weight of Sn is 2.7 times as large as that of graphite, and the theoretical capacity per unit mass of Sn is 8.9 times as large as that of graphite.

However, the volume expansion and contraction of Sn during adsorption and desorption of lithium are large. Thus, when charge and discharge, are performed in a lithium secondary battery in which a negative electrode active material containing Sn is used, Sn repeats expansion and contraction during adsorption and desorption of Li and as a result, the negative electrode active material cracks. When change and discharge are further repeated in this condition, the negative electrode active material cannot withstand drastic expansion and contraction of Sn and therefore falls off the current collector. As a result, electrical conductivity becomes insufficient and charge and discharge become impossible, so that the negative electrode loses its functionality and the cycle characteristics are deteriorated.

In order to solve the above problem, in Japanese Patent Application Publication No. 2003-151543 (JP-A-2003-151543), a negative electrode active material is proposed that contains a negative electrode active material substance containing Sn and carbonaceous matter and in which the carbonaceous matter is covered with the negative electrode active material substance. In the negative electrode active material, carbonaceous matter that exhibits relatively small expansion and contraction caused by charge and discharge is used for cores, so that the stress that occurs because of expansion and contraction is distributed, the negative electrode active material is prevented from being pulverized, and therefore, the cycle characteristics are improved. JP-A-2003-151543 also proposes a negative electrode active material in which the carbonaceous matter is formed into cores and the cores are covered with the negative electrode active material substance and on top of that covered with an electrically conductive material. In this case, the electron conductivity of the negative electrode active material is improved and the increase in contact resistance between the negative electrode active material particles due to expansion and contraction caused by charge and discharge is suppressed, so that the cycle characteristics are improved. However, the negative electrode active material substance nevertheless cracks and falls off the current collector due to expansion and contraction caused by charge and discharge and therefore, the cycle characteristics are not sufficient.

Japanese Patent Application Publication No. 2004-200003 (JP-A-2004-200003) proposed the idea of covering the surface of the negative electrode active material layer containing Li and Sn with carbon material. In this way, the surface of the negative electrode active material layer is electrically uniformized and it is possible to improve the cycle characteristics. However, it cannot be achieved by this method to prevent the negative electrode active material from cracking or falling off the current collector due to expansion and contraction caused by charge and discharge.

Japanese Patent Application Publication No. 2005-347076 (JP-A-2005-347076) proposes a negative electrode active material in which a low melting point alloy and carbon material adhere to the surface of Sn alloy particles that are made amorphous. With this negative electrode active material, it is possible to prevent the negative electrode active material from being pulverized and secure electrically conductive paths. In Japanese Patent Application Publication No. 2004-178922 (JP-A-2004-178922), a negative electrode material is proposed that contains a mixture of particles containing Sn and vapor-grown carbon fibers. JP-A-2004-178922 also describes a technology for covering the surface of particles containing Sn with carbonaceous matter containing a polymer, such as phenol resin. With this negative electrode material, it is possible to improve the electrical conductivity and the cycle characteristics. However, even with these technologies, sufficient improvement in the cycle characteristics is not achieved.

SUMMARY OF THE INVENTION

The invention provides a negative electrode active material excellent in cycle characteristics.

A first aspect of the invention is a negative electrode active material, characterized in that carbonaceous matter essentially consisting of carbon adheres to the surface of a tin particle essentially consisting of tin, with a mixture phase, in which tin and carbon are mixed, interposed between the tin particle and the carbonaceous matter.

According to the first aspect of the invention, because the tin-carbon mixture phase is formed at the interface between the tin particle and the carbonaceous matter, the adhesion between the tin particle and the carbonaceous matter is high, so that it is possible to suppress cracking of the tin particle due to expansion and contraction caused by the charge and discharge reactions and at the same time, it is possible to maintain the electrically conductive paths even when the tin particle cracks. Thus, it is possible to improve cycle characteristics.

In the first aspect of the invention, the carbonaceous matter may be particulate carbonaceous matter and the entire surface of the tin particle may be covered with the particulate carbonaceous matter. In this case, it is possible to effectively suppress cracking of the tin particle due to expansion and contraction caused by the charge and discharge reactions. In addition, it is possible to avoid the situation where the tin particles fuse together and the specific surface area is reduced, which makes relaxation of the stress difficult.

In the first aspect of the invention, the carbonaceous matter may be fibrous carbonaceous matter and part of the surface of the tin particle may be covered with the fibrous carbonaceous matter. Because the fibrous carbonaceous matter has relatively high electric conductivity, the amount of fibrous carbonaceous matter and particulate carbonaceous matter added to tin particles may be relatively small, so that it is possible to increase the density of the tin particles and it is therefore possible to increase the energy density. In addition, because the fibrous carbonaceous matter is highly elastic, even when the tin particles repeat expansion and contraction and as a result crack because of charge and discharge reactions, it is possible to maintain the electrically conductive paths.

In the first aspect of the invention, the carbonaceous matter may be particulate carbonaceous matter and fibrous carbonaceous matter; part of the surface of the tin particle may be covered with the fibrous carbonaceous matter; and substantially the entire surface of the tin particle may be covered with the particulate carbonaceous matter. Because substantially the entire surface of the tin particle is covered with the carbonaceous matter, it is possible to avoid the situation where the tin particles fuse together and the specific surface area is reduced, which makes relaxation of the stress difficult. In addition, because substantially the entire surface of the tin particle is covered with the particulate carbonaceous matter, it is possible to effectively suppress cracking of the tin particle due to expansion and contraction caused by the charge and discharge reactions. In addition, because the fibrous carbonaceous matter is highly elastic, even when the tin particles repeat expansion and contraction and as a result crack because of charge and discharge reactions, it is possible to maintain the electrically conductive paths.

A second aspect of the invention is a lithium secondary battery, characterized in that it has a negative electrode including the above-described negative electrode active material.

According to the second aspect of the invention, because the above-described negative electrode active material is used, a lithium secondary battery is obtained that has excellent cycle characteristics.

A third aspect of the invention is a method of manufacturing a negative electrode active material, characterized by comprising a fusion step that includes: mixing tin particles essentially consisting of tin and carbonaceous matter essentially consisting of carbon; and performing heat treatment at temperatures equal to or higher than the melting point of tin and equal to or lower than 450° C., thereby causing the carbonaceous matter to adhere to the surface of the tin particles.

According to the third aspect of the invention, it is possible to cause the carbonaceous matter to adhere to the surface of the tin particle with high adhesion by melting tin. Thus, it is possible to suppress cracking of the tin particle due to expansion and contraction caused by the charge and discharge reactions and at the same time, it is possible to maintain the electrically conductive paths even when the tin particle cracks, and it is therefore possible to improve cycle characteristics. When heat treatment is performed in an inert atmosphere, the carbonaceous matter functions as a reductant, and it is therefore possible to remove the oxide film formed on the surface of the tin particles. Thus, it is possible to prevent reduction in lithium ion conductivity and maintain high discharge rate capacity.

In the third aspect of the invention, it is preferable that the method of manufacturing a negative electrode active material further include, before the fusion step, a mixing step in which the tin particles and fibrous carbonaceous matter are mixed, wherein particulate carbonaceous matter is used as the carbonaceous matter in the fusion step. This is because it becomes possible to obtain tin particles that are evenly covered with fibrous carbonaceous matter and particulate carbonaceous matter.

According to the invention, tin is used, of which the melting point is relatively low, and the carbonaceous matter adheres to the surface of the tin particle, with the tin-carbon mixture phase interposed therebetween, cycle characteristics are improved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Negative electrode active materials, lithium-ion secondary batteries, and methods of manufacturing negative electrode active materials of the invention will be described in detail below.

A. Negative Electrode Active Material

First, negative electrode active materials of the invention will be described. The negative electrode active material of the invention is characterized in that carbonaceous matter essentially consisting of carbon adheres to the surface of a tin particle essentially consisting of tin, with a mixture phase, in which tin and carbon are mixed, interposed between the carbonaceous matter and the tin particle.

Figure 1:
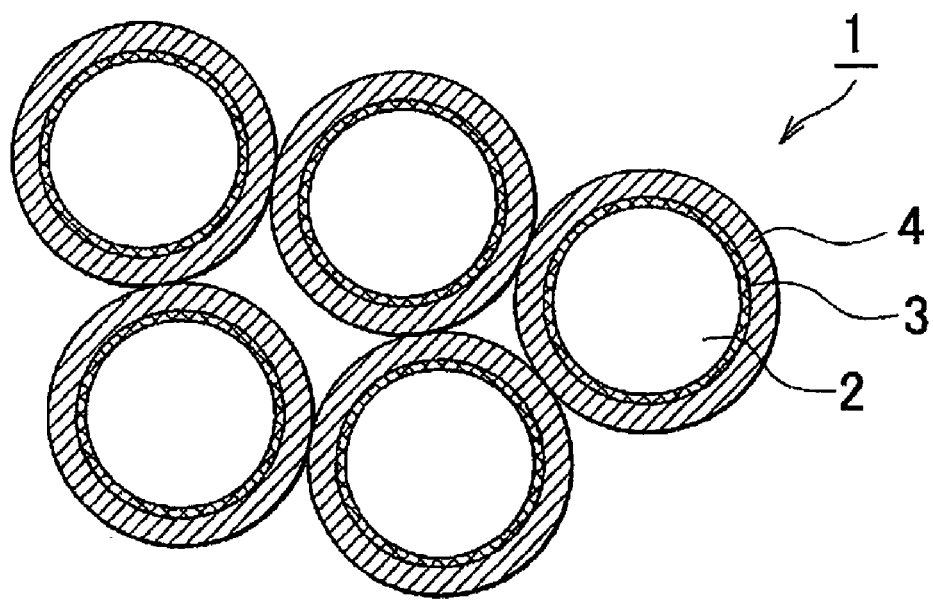
FIG. 1 is a schematic diagram showing an example of a negative electrode active material of the invention.

Negative electrode active materials of the invention will be described with reference to drawings. FIG. 1 is a schematic diagram showing an example of the negative electrode active material of the invention. In the negative electrode active material 1 shown in FIG. 1, carbonaceous matter 4 adheres to the surface of a tin particle 2, with the tin-carbon mixture phase 3 interposed therebetween.

According to the invention, the carbonaceous matter adheres to the surface of the tin particle, with the tin-carbon mixture phase interposed therebetween, so that electrically conductive paths are maintained even when the tin particle repeats expansion and contraction and as a result cracks because of charge and discharge reactions, for example. When the carbonaceous matter adheres to the surface of the tin particle, with the tin-carbon mixture phase interposed therebetween, as compared to the case where carbonaceous matter simply adheres to the surface of the tin particle, the adhesion between the tin particle and the carbonaceous matter is better. Thus, even when the tin particle repeats expansion and contraction caused by charge and discharge reactions, the carbonaceous matter is hard to fall off the tin particle and the electrically conductive paths are well maintained. In particular, even when the tin particle relatively significantly cracks because of charge and discharge reactions, the electrically conductive paths are maintained because not only the tin particle but also the carbonaceous matter are electrically conductive. Thus, it is possible to prevent the negative electrode active material from becoming electrochemically inactive. In this way, according to the invention, it is possible to improve cycle characteristics.

In the negative electrode active material of the invention, carbonaceous matter adheres to the surface of the tin particle, with the tin-carbon mixture phase interposed therebetween. Such a material can be obtained by, for example, mixing tin particles and carbonaceous matter and heat-treating the mixture to melt tin. With the negative electrode active material in which carbonaceous matter fuses with the surface of the tin particle in this way, it is possible to improve the adhesion between the tin particle and the carbonaceous matter. Specifically, when tin is used, of which the melting point is relatively low, it is possible to improve, the adhesion between the tin particle and the carbonaceous matter.

In addition, when the negative electrode active material of the invention is manufactured, if tin particles and carbonaceous matter are mixed and heat treatment is performed in an inert atmosphere, for example, because carbonaceous matter is present on the surface of the tin particles, the carbonaceous matter functions as a reductant, so that it is possible to remove the oxide film formed on the surface of the tin particles. The portion in which the oxide film is formed becomes inactive with lithium. Thus, when carbonaceous matter adheres to the surface of the tin particle, the oxide film on the surface of the tin particle is removed and adsorption and desorption of lithium are smoothed.

In the invention, the construction of the negative electrode active material is not particularly limited as long as carbonaceous matter adheres to the surface of the tin particle, with the tin-carbon mixture phase interposed therebetween. However, there are three preferable forms depending on the type of carbonaceous matter and the adhesion condition. In the first form, the carbonaceous matter is particulate carbonaceous matter and the entire surface of the tin particle is covered with the particulate carbonaceous matter. In the second form, the carbonaceous matter is fibrous carbonaceous matter and part of the surface of the tin particle is covered with the fibrous carbonaceous matter. In the third form, the carbonaceous matter is particulate carbonaceous matter and fibrous carbonaceous matter, part of the surface of the tin particle is covered with the fibrous carbonaceous matter, and substantially the entire surface of the tin particle is covered with particulate carbonaceous matter.

The "particulate carbonaceous matter" herein means the matter in which the aspect ratio of primary particles is equal to or greater than 1 and less than 100. The "fibrous carbonaceous matter" herein means the matter in which the aspect ratio of primary particles is equal to or greater than 100.

The negative electrode active material of the invention in which the carbonaceous matter adheres to the surface of the tin particle, with tin-carbon mixture phase interposed therebetween differs from those obtained by merely mechanically mixing tin particles and carbonaceous matter with the use of a ball mill or the like. For example, in the negative electrode active material in which the carbonaceous matter adheres to the surface of the tin particle, with tin-carbon mixture phase interposed therebetween, the adhesion between the tin particle and the carbonaceous matter is higher as compared to a negative electrode active material that is obtained by mechanically mixing tin particles and carbonaceous matter with the use of a ball mill or the like. Thus, by measuring the adhesion between the tin particle and the carbonaceous matter, it is possible to determine whether the carbonaceous matter adheres to the surface of the tin particle, with the tin-carbon mixture phase interposed therebetween or directly adheres to the surface of the tin particle. Specifically, the state in which carbonaceous matter adheres to the surface of tin particles, with the tin-carbon mixture phase interposed therebetween can be seen by observing the negative electrode active material with the use of a scanning electron microscope (SEM), or subjecting the negative electrode active material to supersonic waves and observing the manner in which the carbonaceous matter falls off.

The negative electrode active materials of the invention will be described below for each form.

In a first form of the negative electrode active material of the invention, carbonaceous matter essentially consisting of carbon adheres to the surface of a tin particle essentially consisting of tin, with a mixture phase, in which tin and carbon are mixed, interposed between the tin particle and the carbonaceous matter, the carbonaceous matter is particulate carbonaceous matter, and the entire surface of the tin particle is covered with the particulate carbonaceous matter.

Figure 2:
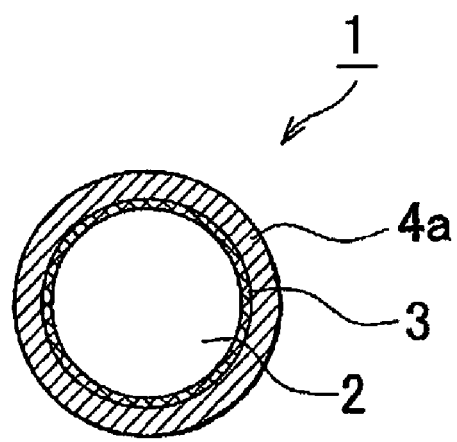
FIG. 2 is a schematic diagram showing another example of a negative electrode active material of the invention.

FIG. 2 is a schematic diagram showing an example of the negative electrode active material of the first form. In the negative electrode active material 1 shown in FIG. 2, carbonaceous matter 4a adheres to the surface of a tin particle 2, with a tin-carbon mixture phase 3 interposed therebetween, and the entire surface of the tin particle 2 is covered with the particulate carbonaceous matter 4a.

According to the first form, as described above, the tin-carbon mixture phase is formed at the interface between the tin particle and the particulate carbonaceous matter, the adhesion between the tin particle and the particulate carbonaceous matter is therefore high, and not only the tin particle but also the particulate carbonaceous matter are electrically conductive. Thus, even when the tin particle repeats expansion and contraction and as a result cracks because of charge and discharge reactions, for example, it is possible to maintain the electrically conductive paths and prevent the negative electrode active material from becoming electrochemically inactive. In addition, because the entire surface of the tin particle is covered with the particulate carbonaceous matter, a restraining force acts on the tin particle when the tin particle expands due to the charge and discharge reactions. In particular, because the tin-carbon mixture phase is harder than the particulate carbonaceous matter and the tin-carbon mixture phase is formed at the interface between the tin particle and the particulate carbonaceous matter, a relatively strong restraining force acts on the tin particle that expands due to the charge and discharge reactions. Thus, it is possible to suppress cracking of the tin particle due to expansion and contraction caused by the charge and discharge reactions and at the same time, it is possible to maintain the electrically conductive paths even when the tin particle cracks. In addition, because the entire surface of the tin particle is covered with the particulate carbonaceous matter, it is possible to prevent the tin particles from fusing together. Thus, it is possible to avoid the situation where the tin particles fuse together and the specific surface area is reduced, which makes relaxation of the stress difficult. In this way, with the first form of the invention, it is possible to improve cycle characteristics.

In addition, in the first form, the entire surface of the tin particle is covered with the particulate carbonaceous matter, so that it is possible to suppress oxidation of the surface of the tin particles and keep tin (metallic tin) unchanged. In addition, when the negative electrode active material of the first form is manufactured, if tin particles and particulate carbonaceous matter are mixed and heat treatment is performed in an inert atmosphere, because the entire surface of the tin particle is covered with the particulate carbonaceous matter, the carbonaceous matter functions as a reductant, so that it is possible to remove the oxide film formed on the surface of the tin particles. If the surface of the tin particle is oxidized and oxide film is formed, the portion in which the oxide film is formed becomes inactive with lithium. Thus, when the entire surface of the tin particle is covered with the particulate carbonaceous matter, it is possible to smooth the adsorption and desorption of lithium to and from the negative electrode active material.

Each of the constituents of the negative electrode active material of the first form will be described below.

(1) Particulate Carbonaceous Matter

The particulate carbonaceous matter used in the first form is essentially consisting of carbon, covers the entire surface of the tin particles, and in general is electrically conductive.

The particulate carbonaceous matter is not particularly limited as long as the carbonaceous matter is essentially consisting of carbon and has the above-described aspect ratio. Examples of the particulate carbonaceous matter include carbon black, such as acetylene black or Ketjenblack (registered trademark).

The shape of the particulate carbonaceous matter is not particularly limited as long as the shape is particulate. Examples of the shape include a spherical shape and an oval shape.

The average particle size of the primary particles of the particulate carbonaceous matter is preferably smaller than the average particle size of tin particles. Specifically, the particle size is preferably within the range of 1 nm to 1000 nm, more preferably within the range of 5 nm to 100 nm, and particularly preferably within the range of 5 nm to 50 nm. This is because, when the average particle size of the primary particles of the particulate carbonaceous matter is too small, there is a possibility that ease of handling is reduced, and on the other hand, when the average particle size of the primary particles of the particulate carbonaceous matter is too large, there is a possibility that it becomes difficult to cover the entire surface of the tin particles with the particulate carbonaceous matter. The average particle size of the primary particles of the particulate carbonaceous matter can be determined by measuring the particle size of the primary particles of the particulate carbonaceous matter that are observed with the use of a scanning electron microscope (SEM) and averaging the particle size, for example. The particle size of a primary particle means the diameter of one particulate carbonaceous matter particle that is not coagulated. In the case of carbon black, for example, the particle size means the diameter of one carbon black particle that is not coagulated.

Coagulations (structures) may be used as the particulate carbonaceous matter.

The particulate carbonaceous matter covers the entire surface of the tin particle. Note that through the observation using an electron microscope or the like, it is possible to confirm that the entire surface of the tin particles is covered with the particulate carbonaceous matter.

The thickness of the particulate carbonaceous matter that covers the tin particle is not particularly limited as long as the entire surface of the tin particles is covered with the particulate carbonaceous matter. The particle size is preferably within the range of 1 nm to 1000 nm, more preferably within the range of 5 nm to 100 nm, and particularly preferably within the range of 5 nm to 50 nm. This is because, when the thickness of the particulate carbonaceous matter that covers the tin particle is too thick, there is a possibility that the density of tin particles is reduced and the energy density is therefore reduced, and on the other hand, when the thickness of the particulate carbonaceous matter that covers the tin particle is too thin, there is a possibility that the restraining force does not sufficiently act when the tin particles expand due to the charge and discharge reactions and it becomes hard to prevent the particles from fusing together. The thickness of the particulate carbonaceous matter that covers the tin particle may be either uniform or non-uniform.

(2) Tin Particles

The tin particles used in the invention are essentially consisting of tin. In the invention, because the tin-carbon mixture phase is formed at the interface between the tin particle and the carbonaceous matter by melting tin, the tin particles essentially consists of tin. The tin particles may contain elements other than tin within the range in which the melting point of the tin particles does not become higher than the melting point of tin.

The shape of tin particles is not particularly limited and examples of the shape include a grain-like shape, a plate shape and a needle-like shape. Among others, the shape of tin particles is preferably the grain-like shape. Examples of the shape of the grain-like tin particles include a spherical shape and an oval shape.

The average particle size of tin particles is preferably within the range of 0.01 μm to 100 μm, more preferably within the range of 0.05 μm to 10 μm, and particularly preferably within the range of 0.1 μm to 1 μm. This is because, when the average particle size of tin particles is too small, there is a possibility that ease of handling is reduced, and on the other hand, when the average particle size of tin particles is too large, there is a possibility that it becomes difficult to obtain a flat negative electrode. The average particle size of tin particles can be determined by measuring the particle size of tin particles that are observed with the use of a scanning electron microscope (SEM), for example, and averaging the particle size.

(3) Tin-Carbon Mixture Phase

In the first form, the particulate carbonaceous matter adheres to the surface of tin particles, with the tin-carbon mixture phase interposed therebetween. The tin-carbon mixture phase may be an intermetallic compound or a solid solution of tin and carbon. The mixture phase may be either crystalline or amorphous.

Note that through the above-described examination method, it is possible to confirm that the particulate carbonaceous matter adheres to the surface of tin particles, with the tin-carbon mixture phase interposed therebetween.

Next, a second form of the negative electrode active material of the invention will be described. In the second form of the negative electrode active material of the invention, carbonaceous matter essentially consisting of carbon adheres to the surface of a tin particle essentially consisting of tin, with a mixture phase, in which tin and carbon are mixed, interposed between the carbonaceous matter and the tin particle, the carbonaceous matter is fibrous carbonaceous matter, and part of the surface of the tin particle is covered with the fibrous carbonaceous matter.

Figure 3:
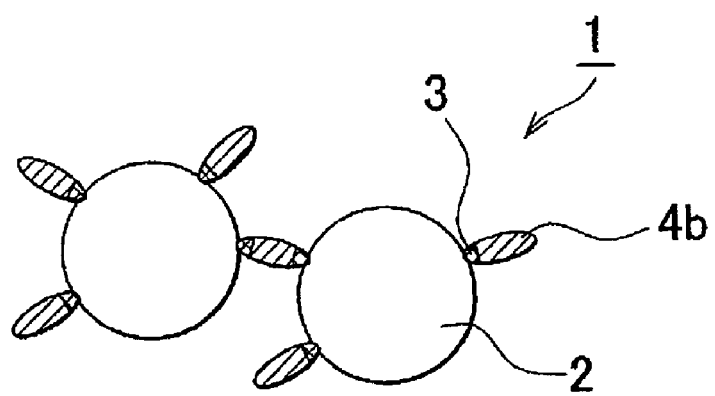
FIG. 3 is a schematic diagram showing another example of a negative electrode active material of the invention.

FIG. 3 is a schematic diagram showing an example of the negative electrode active material of the second form. In the negative electrode active material 1 shown in FIG. 3, carbonaceous matter 4b adheres to the surface of a tin particle 2, with a tin-carbon mixture phase 3 interposed therebetween, and part of the surface of the tin particle 2 is covered with the fibrous carbonaceous matter 4b.

According to the second form, as described above, the tin-carbon mixture phase is formed at the interface between the tin particle and the fibrous carbonaceous matter, the adhesion between the tin particle and the fibrous carbonaceous matter is therefore high, and not only the tin particles but also the particulate carbonaceous matter are electrically conductive. Thus, even when the tin particles repeat expansion and contraction and as a result crack because of charge and discharge reactions, for example, it is possible to maintain the electrically conductive paths and prevent the negative electrode active material from becoming electrochemically inactive. In particular, the fibrous carbonaceous matter is highly elastic and has high strength and therefore, the fibrous carbonaceous matter can withstand severe expansion and contraction of tin particles. Thus, even when the tin particles repeat expansion and contraction and crack due to the charge and discharge reactions, it is possible to maintain the electrically conductive paths and effectively prevent the negative electrode active material from becoming electrochemically inactive. In addition, because the fibrous carbonaceous matter has excellent elasticity, the fibrous carbonaceous matter can absorb the stress caused by expansion and contraction of the tin particles, so that it is possible to prevent the negative electrode active material from falling off the negative electrode current collector. In this way, with the second form of the invention, it is possible to improve cycle characteristics.

Moreover, because the fibrous carbonaceous matter has relatively high electrical conductivity and is highly elastic, it is possible to improve cycle characteristics even when the amount of fibrous carbonaceous matter added to tin particles is small. When the amount of fibrous carbonaceous matter added to tin particles is relatively small, the density of tin particles becomes high, so that it is possible to increase the energy density. In the second form, because it is possible to improve cycle characteristics even when the amount of fibrous carbonaceous matter added to tin particles is relatively small, the fibrous carbonaceous matter adheres not to the entire surface of the tin particles but to part of the surface thereof.

In addition, when the negative electrode active material of the second form is manufactured, if tin particles and fibrous carbonaceous matter are mixed and heat treatment is performed in an inert atmosphere, because fibrous carbonaceous matter is present on the surface of the tin particles and functions as a reductant, it is possible to remove the oxide film formed on the surface of the tin particles. Thus, it is possible to smooth adsorption and desorption of lithium.

The tin particles and the tin-carbon mixture phase are similar to those described in connection with the first form and therefore, description thereof is not repeated. The fibrous carbonaceous matter, which is a constituent element of the negative electrode active material of the second form, will be described below.

The fibrous carbonaceous matter used in the second form essentially consists of carbon, covers part of the surface of the tin particles, and in general is electrically conductive.

The fibrous carbonaceous matter is not particularly limited as long as the carbonaceous matter essentially consists of carbon and has the above-described aspect ratio. Examples of the fibrous carbonaceous matter include carbon nanotubes, carbon nanowires, carbon nanofibers, carbon nanohorns, carbon nanocoils, etc.

Among others, carbon nanotubes are preferable. This is because carbon nanotubes have a hollow tubular shape and when tin is melted in manufacturing the negative electrode active material of the invention, tin disperses into carbon nanotubes and the electrically conductive paths are well maintained even when the tin particle cracks as a result of volume expansion and contraction caused by the charge and discharge reactions. In addition, tin is melted and spreads along the carbon nanotubes in the longitudinal direction thereof, which is advantageous in forming the electrically conductive paths.

The carbon nanotubes are not particularly limited. Any of single-walled carbon nanotubes and multi-walled carbon nanotubes, such as double-walled carbon nanotubes, may be used.

The shape of the fibrous carbonaceous matter is not particularly limited as long as the shape is fibrous and the aspect ratio is relatively large as described above. The cross section of the fibrous carbonaceous matter may be either solid or hollow.

The diameter and the length of the cross section of fibrous carbonaceous matter is not particularly limited and is similar to the diameter and the length of common carbon nanotubes.

The fibrous carbonaceous matter covers part of the surface of the tin particle. The ratio in which the fibrous carbonaceous matter covers the surface of the tin particle can be controlled by appropriately adjusting the amount of fibrous carbonaceous matter and tin particles when the negative electrode active material of the second form is manufactured. The ratio of the fibrous carbonaceous matter to the tin particles is, relative to 100 parts by weight of tin particles, preferably within the range of 0.1 part by weight to 50 parts by weight, more preferably within the range of 1 part by weight to 30 parts by weight, and particularly preferably within the range of 5 parts by weight to 20 parts by weight. This is because, when the ratio of the fibrous carbonaceous matter to the tin particles is too high, there is a possibility that the density of tin particles is reduced and the improvement of the energy density is therefore not attained, and on the other hand, when the ratio of the fibrous carbonaceous matter to the tin particles is too low, the improvement of the cycle characteristics is not sufficiently attained. Note that through the observation using an electron microscope or the like, it is possible to confirm that part of the surface of the tin particles is covered with the fibrous carbonaceous matter.

Next, a third form of the negative electrode active material of the invention will be described. In the third form of the negative electrode active material of the invention, carbonaceous matter essentially consisting of carbon adheres to the surface of a tin particle essentially consisting of tin, with a mixture phase, in which tin and carbon are mixed, interposed between the carbonaceous matter and the tin particle, the carbonaceous matter is particulate carbonaceous matter and fibrous carbonaceous matter, part of the surface of the tin particle is covered with the fibrous carbonaceous matter, and substantially the entire surface of the tin particle is covered with the particulate carbonaceous matter.

Figure 4:
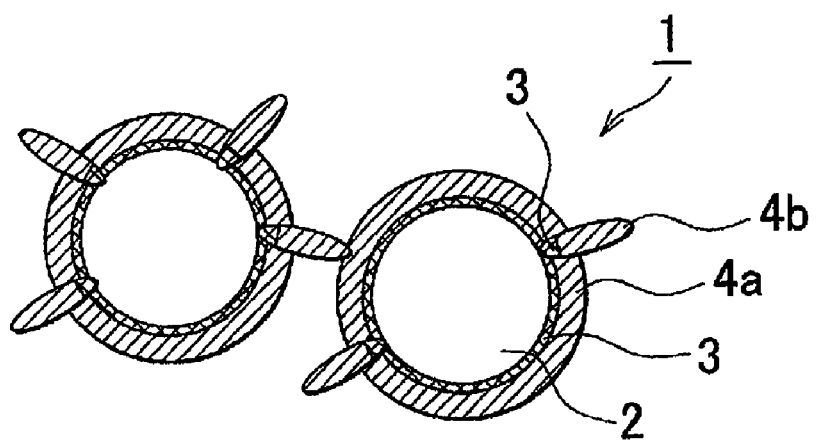
FIG. 4 is a schematic diagram showing another example of a negative electrode active material of the invention.

FIG. 4 is a schematic diagram showing an example of the negative electrode active material of the third form. In the negative electrode active material 1 shown in FIG. 4, carbonaceous matter 4a and fibrous carbonaceous matter 4b adhere to the surface of a tin particle 2 with a tin-carbon mixture phase 3 interposed therebetween, part of the surface of the tin particle 2 is covered with fibrous carbonaceous matter 4b, and substantially the entire surface of the tin particle 2, other than the part covered with the fibrous carbonaceous matter, is covered with the particulate carbonaceous matter 4a.

According to the third form, as described above, the tin-carbon mixture phase is formed at the interface between the tin particle, and the particulate carbonaceous matter and the fibrous carbonaceous matter, the adhesion between the tin particle, and the particulate carbonaceous matter and the fibrous carbonaceous matter is therefore high, and not only the tin particle but also the particulate carbonaceous matter and the fibrous carbonaceous matter are electrically conductive. Thus, even when the tin particles repeat expansion and contraction and as a result crack because of charge and discharge reactions, for example, it is possible to maintain the electrically conductive paths and prevent the negative electrode active material from becoming electrochemically inactive. In addition, because substantially the entire surface of the tin particle is covered with the particulate carbonaceous matter and the tin-carbon mixture phase is formed at the interface between the tin particle and the particulate carbonaceous matter, as in the case of the first form, a restraining force acts on the tin particle when the tin particle expands because of the charge and discharge reactions, so that it is possible to suppress cracking of the tin particle due to expansion and contraction caused by the charge and discharge reactions and it is also possible to maintain the electrically conductive paths even when the tin particle cracks. In addition, as in the case of the second form, the fibrous carbonaceous matter is highly elastic and has high strength and therefore, the fibrous carbonaceous matter can withstand severe expansion and contraction of the tin particles and facilitates formation of the electrically conductive paths, and it is therefore possible to effectively prevent the negative electrode active material from becoming electrochemically inactive. In addition, because the entire surface of the tin particle is covered with the particulate carbonaceous matter and the fibrous carbonaceous matter, it is possible to prevent the tin particles from fusing together. Thus, it is possible to avoid the situation where the tin particles fuse together and the specific surface area is reduced, which makes relaxation of stress difficult. In this way, with the third form of the invention, it is possible to improve cycle characteristics.

In addition, in the third form, the entire surface of the tin particles is covered with the particulate carbonaceous matter and the fibrous carbonaceous matter, so that it is possible to suppress oxidation of the surface of the tin particles and keep tin (metallic tin) unchanged. In addition, when the negative electrode active material of the invention is manufactured, if tin particles, particulate carbonaceous matter, and fibrous carbonaceous matter are mixed and heat treatment is performed in an inert atmosphere, because the entire surface of the tin particles is covered with the particulate carbonaceous matter and the fibrous carbonaceous matter, the particulate carbonaceous matter and the fibrous carbonaceous matter function as a reductant, so that it is possible to remove the oxide film formed on the surface of the tin particles. Thus, it is possible to smooth adsorption and desorption of lithium to and from the negative electrode active material.

The particulate carbonaceous matter, the tin particles and the tin-carbon mixture phase are similar to those described in connection with the first form, and the fibrous carbonaceous matter is similar to that described in connection with the second form. Thus, description thereof is omitted. Other features of the negative electrode active material of the third form will be described below.

The fibrous carbonaceous matter covers part of the surface of the tin particle. The ratio in which the fibrous carbonaceous matter covers the surface of the tin particles can be controlled by appropriately adjusting the amount of fibrous carbonaceous matter and tin particles when the negative electrode active material of the third form is manufactured. The ratio of the fibrous carbonaceous matter to the tin particles is similar to that described in connection with the second form.

The particulate carbonaceous matter covers substantially the entire surface of the tin particles. The thickness of the particulate carbonaceous matter that covers the tin particles is similar to that of the first form. In the third form, because the fibrous carbonaceous matter has relatively high electric conductivity, it is possible to improve cycle characteristics even when the amount of fibrous carbonaceous matter and particulate carbonaceous matter added to tin particles is relatively small. Thus, the thickness of the particulate carbonaceous matter that covers the tin particles may be thinner as compared to the corresponding thickness of the first form.

The mixing ratio of the fibrous carbonaceous matter and the particulate carbonaceous matter can be controlled by appropriately adjusting the amount of fibrous carbonaceous matter and particulate carbonaceous matter when the negative electrode active material of the third form is manufactured. With regard to the mixing ratio (weight ratio) of the fibrous carbonaceous matter and the particulate carbonaceous matter, the ratio of the particulate carbonaceous matter to the fibrous carbonaceous matter is preferably within the range of 0.01 to 100, more preferably within the range of 0.1 to 10, and particularly preferably within the range of 0.5 to 5. This is because, when the ratio of the particulate carbonaceous matter to the fibrous carbonaceous matter is too high, there is a possibility that the fibrous carbonaceous matter is buried under the particulate carbonaceous matter and it becomes difficult to form the electrically conductive paths between the tin particles, and on the other hand, when the ratio of the particulate carbonaceous matter to the fibrous carbonaceous matter is too low, there is a possibility that it becomes difficult to cover substantially the entire surface of the tin particles with the particulate carbonaceous matter.

Note that through the observation using an electron microscope or the like, it is possible to confirm that part of the surface of the tin particles is covered with the fibrous carbonaceous matter and substantially the entire surface of the tin particles is covered with the particulate carbonaceous matter.

B. Lithium Secondary Battery

The lithium secondary battery of the invention is characterized in that it has a negative electrode including the above-described negative electrode active material. Specifically, the lithium secondary battery of the invention has a negative electrode including the negative electrode active material in which carbonaceous matter essentially consisting of carbon adheres to the surface of a tin particle essentially consisting of tin, with a mixture phase, in which tin and carbon are mixed, interposed between the tin particle and the carbonaceous matter.

Figure 5:
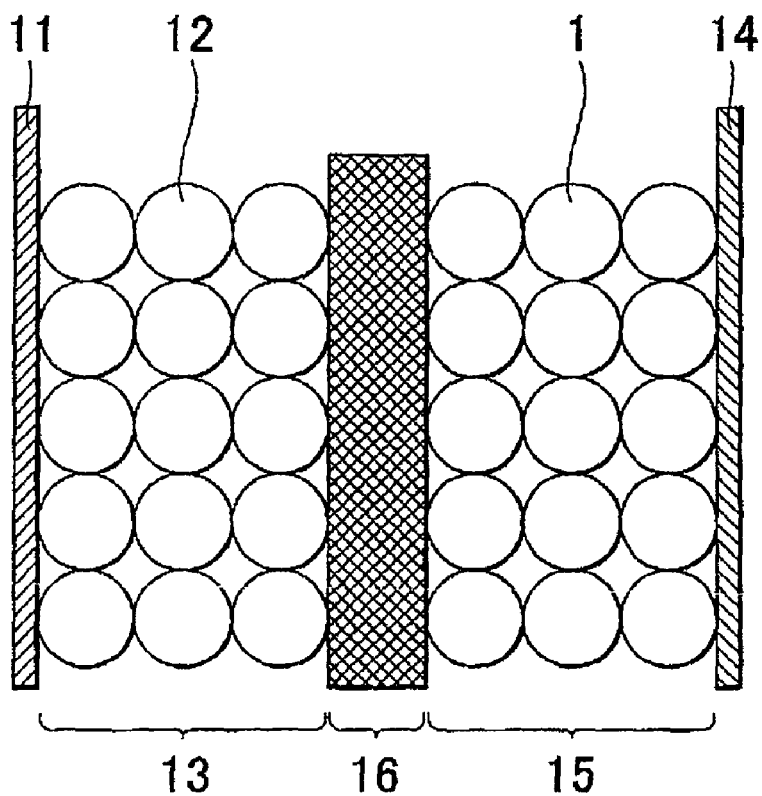
FIG. 5 is a schematic cross section showing an example of a lithium secondary battery of the invention.

FIG. 5 is a schematic cross section showing an example of the lithium secondary battery of the invention. The lithium secondary battery illustrated in FIG. 5 includes; a positive electrode current collector 11; a positive electrode 13 including the positive electrode active material 12; a negative electrode current collector 14; a negative electrode 15 including the negative electrode active material 1 in which carbonaceous matter adheres to the surface of the tin particle, with the tin-carbon mixture phase interposed therebetween; a separator 16 disposed between the positive electrode 13 and the negative electrode 15; and an organic electrolyte (not shown) disposed so as to contact the positive electrode active material 12 and the negative electrode active material 1.

According to the invention, because the negative electrode including the above-described negative electrode active material is used, cycle characteristics are excellent. Each of the components of the lithium secondary battery of the invention will be described below.

1. Negative Electrode

The negative electrode used in the invention includes the negative electrode active material in which carbonaceous matter essentially consisting of carbon adheres to the surface of a tin particle essentially consisting of tin, with a mixture phase, in which tin and carbon are mixed, interposed between the carbonaceous matter and the tin particle. The negative electrode active material has already been described in detail in the above section "A. Negative Electrode Active Material," and description thereof is not repeated.

The negative electrode used in the invention may further include an electrically conductive agent and a binder. Examples of the binder include polyvinylidene fluoride (PVDF) and polytetrafluoro ethylene (PIPE). Examples of the electrically conductive agent include carbon black, such as acetylene black or Ketjenblack (registered trademark).

A commonly available method can be used as the method of forming the negative electrode. For example, the negative electrode can be formed by applying a negative electrode-forming paste containing the above-described negative electrode active material, the binder and the electrically conductive agent on a negative electrode current collector, and then drying and pressing the thus-obtained workpiece.

The negative electrode may be formed on the negative electrode current collector. The material for the negative electrode current collector is not particularly limited as long as the material is electrically conductive. Examples of the material include copper, stainless steel, and nickel.

2. Positive Electrode

The positive electrode of the invention includes at least the positive electrode active material and may include an electrically conductive agent and a binder as needed.

The positive electrode active material is not particularly limited as long as it can adsorb and desorb lithium ion. Examples of the positive electrode active material include $LiCoO_2$, $LiCoPO_4$, $LiMn_2O_4$, $LiNiO_2$, $LiFePO_4$, $LiCo_{1/3}Ni_{1/3}Mn_{1/3}O_2$, $LiMnPO_4$, and $LiNi_{0.5}Mn_{1.5}O_4$. Among others, $LiCoO_2$ is preferable.

The positive electrode may be formed on the positive electrode current collector. The material for the positive electrode current collector is not particularly limited as long as the material is electrically conductive. Examples of the material include aluminum, SUS, nickel, iron, and titanium. Among others, aluminum and SUS are preferably used.

With regard to the electrically conductive agent and the binder used for the positive electrode, those similar to the electrically conductive agent and the binder used for the negative electrode can be used. The method of forming the positive electrode is also similar to the method of forming the negative electrode, and description thereof is not repeated.

3. Organic Electrolyte

The organic electrolyte used in the invention has a function of transmitting lithium ion between the positive electrode active material and the negative electrode active material. Examples of the organic electrolyte include an organic electrolyte solution, a polymer electrolyte, and a gel electrolyte.

In general, a nonaqueous electrolyte solution containing lithium salt and nonaqueous solvent is used as the organic electrolyte solution. The lithium salt is not particularly limited as long as it is a lithium salt that is used in a common lithium secondary battery. Examples of the lithium salt include $LiPF_6$, $LiBF_4$, $LiN(CFB_3SO_2)_2$, $LiCF_3SO_3$, $LiC_4F_9SO_3$, $LiC(CF_3SO_2)_3$, and $LiClO_4$. The nonaqueous solvent is not particularly limited as long as it can dissolve the lithium salt. Examples of the nonaqueous solvent include propylene carbonate, ethylene carbonate, diethyl carbonate, dimethyl carbonate, ethyl methyl carbonate, 1,2-dimethoxy ethane, 1,2-diethoxy ethane, acetonitrile, propionitrile, tetrahydrofuran, 2-methyltetrahydrofuran, dioxane, 1,3-dioxolane, nitromethane, N,N-dimethyl formaldehyde, dimethyl sulfoxide, sulfolane, and γ-butyrolactone. The nonaqueous solvent may be used alone or otherwise two or more of these nonaqueous solvents may be mixed for use. Alternatively, a room-temperature liquid salt may be used as the nonaqueous electrolyte solution.

The polymer electrolyte contains a lithium salt and a polymer. As this lithium salt, a lithium salt similar to the lithium salt used in the organic electrolyte solution can be used. This polymer is not particularly limited as long as it forms a complex with a lithium salt. Examples of the polymer include polyethylene oxide.

A gel electrolyte contains a lithium salt, a polymer, and a nonaqueous solvent. As this lithium salt and this nonaqueous solvent, those similar to the lithium salt and the nonaqueous solvent used in the organic electrolyte solution can be used. This polymer is not particularly limited as long as it can be turned into a gel. Examples of this polymer include polyethylene oxide, polypropylene oxide, polyacrylonitrile, polyvinylidene fluoride (PVDF), polyurethane, polyacrylate, and cellulose.

4. Other Components

The lithium secondary battery of the invention may have a separator disposed between the positive electrode and the negative electrode. The separator used in the invention is not particularly limited as long as it has a function of holding the organic electrolyte. Examples of the separator include a porous film, such as one made of polyethylene or polypropilene, a non-woven fabric, such as a resin non-woven fabric or a glass-fiber non-woven fabric.

The shape of the battery case used in the invention is not particularly limited as long as it can accommodate the positive electrode, the negative electrode, the organic electrolyte, the separator, the positive electrode current collector, the negative electrode current collector, etc. Specific examples of the shape include a cylindrical shape, a rectangular box shape, a coin shape, and a laminate shape. The lithium secondary battery of the invention includes an electrode unit that is constituted of a positive electrode, a separator, and a negative electrode. The shape of the electrode unit is not particularly limited. Specific examples of the shape include a plate shape and a rolled shape.

C. Method of Manufacturing Negative Electrode Active Material

A method of manufacturing a negative electrode active material of the invention is characterized by including a fusion step that includes: mixing tin particles essentially consisting of tin and carbonaceous matter essentially consisting of carbon; and performing heat treatment at temperatures equal to or higher than the melting point of tin and equal to or lower than 450° C., thereby causing the carbonaceous matter to adhere to the surface of the tin particles.

Figure 6A:
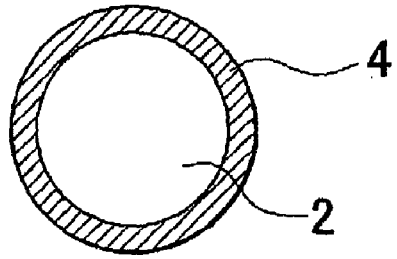
FIGS. 6A and 6B are schematic diagrams showing an example of a method of manufacturing a negative electrode active material of the invention.
Figure 6B:
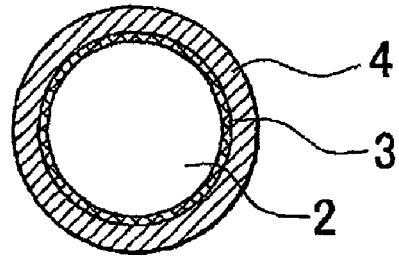

A method of manufacturing a negative electrode active material of the invention will be described with reference to drawings. FIGS. 6A and 6B are schematic diagrams showing an example of the method of manufacturing a negative electrode active material of the invention. In the method of manufacturing a negative electrode active material shown in FIGS. 6A and 6B, first, tin particles and carbonaceous matter are mixed. As a result, as shown in FIG. 6A, the carbonaceous matter 4 is placed on the surface of the tin particle 2. Then, heat treatment is performed at temperatures equal to or higher than the melting point of tin and equal to or lower than 450° C., whereby tin is melted and as shown in FIG. 6B, the tin-carbon mixture phase 3 is formed at the interface between the tin particle 2 and the carbonaceous matter 4. Because of the fusion, the adhesion between the tin particle and the carbonaceous matter is improved.

According to the invention, tin is melted during the heat treatment, and the tin-carbon mixture phase is formed at the interface between the tin particle and the carbonaceous matter, so that the carbonaceous matter adheres to the surface of the tin particle with high adhesion. Thus, even when the tin particles repeat expansion and contraction caused by charge and discharge reactions, for example, it is possible to maintain the electrically conductive paths and therefore improve cycle characteristics.

When heat treatment is performed in an inert atmosphere, because the carbonaceous matter is present on the surface of the tin particles, the carbonaceous matter functions as a reductant, so that it is possible to remove the oxide film formed on the surface of the tin particles. In this way, it is possible to remove the portion inactive with lithium, smooth adsorption and desorption of lithium, and maintain high discharge rate capacity.

In the invention, it is preferable that before the fusion step, a mixing step be performed in which the tin particles and the carbonaceous matter are mixed, and particulate carbonaceous matter is used as the carbonaceous matter in the fusion step. In this way, the negative electrode active material of the third form can be manufactured. When such steps are adopted, it is possible to prevent the tin particles from fusing together in the fusion step. Thus, it is possible to avoid the situation where the tin particles fuse together and the specific surface area is reduced, which makes relaxation of the stress difficult.

Each of steps of the method of manufacturing the negative electrode active material of the invention will be described below.

1. Fusion Step

A fusion step of the invention is a step in which tin particles essentially consisting of tin are mixed with carbonaceous matter essentially consisting of carbon, heat treatment is performed at temperatures equal to or higher than the melting point of tin and equal to or lower than 450° C., and the carbonaceous matter is caused to adhere to the surface of the tin particles by fusion.

The tin particles and the carbonaceous matter have already been described in detail in the above section "A. Negative Electrode Active Material," and description thereof is not repeated.

When particulate carbonaceous matter is used as the carbonaceous matter, the negative electrode active material of the first form described in the above section "A. Negative Electrode Active Material" can be manufactured. In this case, the ratio of the particulate carbonaceous matter to the tin particles is, relative to 100 parts by weight of tin particles, preferably within the range of 0.1 part by weight to 50 parts by weight, more preferably within the range of 1 part by weight to 30 parts by weight, and particularly preferably within the range of 5 parts by weight to 20 parts by weight. This is because when the ratio of the particulate carbonaceous matter to the tin particles is too high, there is a possibility that the density of tin particles is reduced and the energy density is therefore reduced, and when the ratio of the particulate carbonaceous matter to the tin particles is too low, there is a possibility that it becomes difficult to cover the entire surface of the tin particles with the particulate carbonaceous matter.

When fibrous carbonaceous matter is used as the carbonaceous matter, the negative electrode active material of the second form described in the above section "A. Negative Electrode Active Material" can be manufactured. The ratio of fibrous carbonaceous matter to tin particles have already been described in the description of the second form in the above section "A. Negative Electrode Active Material," and description thereof is not repeated.

The method of mixing tin particles and carbonaceous matter is not particularly limited as long as it is possible to uniformly mix the tin particles and the carbonaceous matter and place the carbonaceous matter on the surface of the tin particles. Specific examples of such a method include a method in which mixing is performed mechanically.

As the method in which mixing is performed mechanically, a method using a ball mill is preferable. A method using a ball mill is a commonly used method, and in addition, it is possible to achieve high adhesion of the carbonaceous matter to the surface of the tin particles. As a ball mill, a planetary ball mill, for example, can be used.

When a ball mill is used, the diameter of and the material for crushing balls, the material for a reaction vessel, etc. are the same as those of a common ball mill and are not particularly limited.

The rotational speed of the ball mill when mixing is performed using the ball mill may be set within the range of approximately 100 rpm to 600 rpm, for example, more preferably within the range of 150 rpm to 550 rpm, and particularly preferably within the range of 200 rpm to 400 rpm.

The time period during which mixing is performed using a ball mill is not particularly limited as long as it is possible to uniformly mix the tin particles and the carbonaceous matter and place the carbonaceous matter on the surface of the tin particles. Specifically, the time period is preferably equal to or longer than 0.5 hour, more preferably within the range of 1 hour to 30 hours, and particularly preferably within the range of 3 hours to 20 hours. This is because, when the time period is too short, there is a possibility that the adhesion of the carbonaceous matter to the surface of the tin particles is reduced and it becomes difficult to form the tin-carbon mixture phase at the interface between the tin particles and the carbonaceous matter in a subsequent heat treatment process.

The atmosphere used when tin particles and carbonaceous matter is not particularly limited and is typically the atmospheric atmosphere.

In the invention, heat treatment is performed at temperatures equal to or higher than the melting point of tin and equal to or lower than 450° C. The melting point of tin is about 232° C. When the temperature is within the above range, the tin-carbon mixture phase is formed at the interface between the tin particles and the carbonaceous matter and it is possible to improve the adhesion between the tin particles and the carbonaceous matter. When the heat treatment temperature is too high, there is a possibility that the tin-carbon mixture phase becomes excessive and it becomes difficult to perform charge and discharge. When the carbonaceous matter is placed on part of the surface of the tin particles and the amount of carbonaceous matter that covers the tin particles is small, if the heat treatment temperature is too high, there is a possibility that the tin particles fuse together and the specific surface area is reduced, which makes relaxation of stress difficult and reduces the durability of the negative electrode active material.

The heat treatment method is not particularly limited as long as it is possible to subject the negative electrode active material to a desired temperature. Examples of the heat treatment method include a method in which heating is performed using a heating furnace.

It is preferable that the heat treatment be performed in an inert atmosphere. If oxygen is present, an oxide film is easily formed on the surface of the tin particles and the oxide film can obstruct the electrical conduction path. When the heat treatment is performed in an inert atmosphere, however, it is possible to suppress formation of the oxide film. In addition, when an inert atmosphere is adopted, the carbonaceous matter is allowed to function as a reductant. Examples of inert gas include argon (Ar), Nitrogen ($N_2$) and Helium (He). Among others, Ar is preferable.

The heat treatment time is not particularly limited as long as the tin-carbon mixture phase is formed at the interface between the tin particles and the carbonaceous matter in the heat treatment time.

2. Mixing Step

In the invention, as described above, it is preferable that before the fusion step, a mixing step be performed in which the tin particles and the fibrous carbonaceous matter are mixed, and particulate carbonaceous matter be used as the carbonaceous matter in the fusion step. The mixing step will be described below.

The method of mixing the tin particles and the fibrous carbonaceous matter is similar to the method of mixing the tin particles and the carbonaceous matter in the fusion step and therefore, description thereof is not repeated.

The time period during which mixing is performed using a ball mill is not particularly limited as long as it is possible to uniformly mix tin particles and fibrous carbonaceous matter and place the fibrous carbonaceous matter on the surface of the tin particles. Specifically, the time period is preferably equal to or longer than 0.5 hour, more preferably within the range of 1 hour to 30 hours, and particularly preferably within the range of 3 hours to 20 hours. This is because, when the time period is too short, there is a possibility that the adhesion of the fibrous carbonaceous matter to the surface of the tin particles is reduced and it becomes difficult to form the tin-carbon mixture phase at the interface between the tin particles and the fibrous carbonaceous matter in a subsequent heat treatment process.

In the invention, it is preferable that heat treatment be performed at temperatures equal to or higher than 100° C. and lower than the Melting point of tin after the tin particles and the fibrous carbonaceous matter are mixed. This is because it becomes possible to place the fibrous carbonaceous matter on the surface of the tin particles with high adhesion. In addition, when the heat treatment is performed at temperatures within the above described range, it is possible to place the fibrous carbonaceous matter on the surface of the tin particles so that the fibrous carbonaceous matter is not buried under the particulate carbonaceous matter and part of the fibrous carbonaceous matter is exposed when the particulate carbonaceous matter is added in the fusion step.

The heat treatment method, the atmosphere, the heat treatment time, etc. are similar to those of the fusion step, and description thereof is not repeated.

The invention is not limited to the above-described embodiments. The above-described embodiments are described by way of example and any modification that has substantially the same composition as that according to the technical concept described in claims of the invention and exhibits a similar effect is included within the technical scope of the invention.

The invention will be more specifically described below using examples.

Example 1 and Comparative Examples

Preparation of Negative Electrode Active Material

After Sn powder and acetylene black (AB) were mixed (Sn:AB=80:20 (weight ratio)) in a mortar for 30 minutes and then, the mixture was processed in a ball mill for 3 hours, 10 hours, or 15 hours. Then, firing (heat treatment) was performed at 150° C., 350° C. (Example 1), or 600° C. in a pure (100%) argon atmosphere. In this way, the negative electrode active material in which acetylene black was fused with the surface of Sn particles was obtained.

Making of Negative Electrode

A paste was prepared by introducing 1 g of the above-described negative electrode, active material into a solution in which 0.05 g of a binder, polyvinylidene fluoride (PVDF), was dissolved in a solvent, n-methylpyrrolidone, and then mixing the mixture until a uniform mixture was obtained. Subsequently, the paste was applied on one side of a Cu current collector, of which the thickness was 10 μm, at an application volume of 6.4 mg/cm$^2$ and then the thus-obtained workpiece was dried at 120° C., whereby an electrode was made. Subsequently, the electrode was pressed to make the density and the thickness of the paste 1.4 g/cm$^3$ and 20 nm, respectively. Then, the electrode was cut to have a diameter of 16 mm, whereby a negative electrode was obtained.

Preparation of Positive Electrode

Li metal was used as the positive electrode. Li metal was cut to have a diameter of 19 mm, whereby a positive electrode was obtained.

Making of Lithium Secondary Battery

A CR2032 coin cell was made using the obtained negative and positive electrodes. A polypropylene (PI)) porous separator was used as the separator and a solution, in which a supporting salt, lithium phosphate hexafluoride, LiPF$_6$, was dissolved, at a 1 mol/L concentration, in a mixed solvent of ethylene carbonate (EC) and dimethyl carbonate (DMC), was used as the electrolyte solution.

As a Comparative Example, a lithium secondary battery was made in a way the same as that of Example 1, except that heat treatment was not performed in the process of preparing the negative electrode active material of Example 1.

Evaluation

The cycle characteristics of the coin cells of Example 1 and Comparative Examples were evaluated. The cycle characteristics were evaluated as follows (the evaluation was conducted at 25° C.): (1) The capacity was tested under conditions that the discharge rate was C/10 within a range between 0.05V and 1.5V; (2) The battery was charged and discharged for 20 cycles at 1C; (3) The capacity was again tested under conditions that the discharge rate was 0110 within a range between 0.05V and 1.5V; and (4) The above tests (1) to (3) were repeated until the capacity decreases and when the rate at which the ampere-hour capacity is maintained approaches 50%, the capacity was checked frequently. Table 1 shows relations between the number of cycles during which the ampere-hour capacity is maintained, and heat treatment temperature and ball mill process time. The number of cycles during which the ampere-hour capacity is maintained is determined based on the point at which the rate at which the ampere-hour capacity is maintained becomes equal to or less than 50%.

TABLE 1

The number of cycles during which ampere-hour capacity is maintained

|  | Heat Treatment Temperature (° C.) | Ball Milling Time (h) | | | Remark |
|---|---|---|---|---|---|
|  |  | 3 | 10 | 15 |  |
| Example 1 and Comparative Examples | 150 | 60 | 140 | 140 | Comparative Examples |
|  | 350 | 150 | 200 | 200 | Examples of the Invention |
|  | 600 | 100 | 160 | 160 | Comparative Examples |
| Comparative Example | Without Heat Treatment | 20 | 23 | 23 | Comparative Examples |

The cycle characteristics are improved for all the coin cells for which the process using the ball mill was performed for more than 10 hours and firing was performed at 350° C. With regard to Comparative Example for which heat treatment was not performed, there is no change in the capacity.

Example 2 and Comparative Examples

A lithium secondary battery was made in a way the same as that of Example 1, except that a negative electrode active material and a negative electrode were prepared as described below.

Preparation of Negative Electrode Active Material

Sn powder and carbon nanotubes (CNT) were mixed in a mortar for 30 minutes. The amount of CNT was 5 wt % relative to the total amount (100 wt %) of Sn and CNT. Subsequently, the mixture was processed in the ball mill for 15 hours. Then, firing (heat treatment) was performed at 150° C., 350° C. (Example 2), or 600° C. in a pure (100%) argon atmosphere. In this way, the negative electrode active material in which CNT was fused with the surface of Sn particles was obtained.

Making of Negative Electrode

A paste was prepared by introducing 1 g of the above-described negative electrode active material into a solution in which 0.05 g of a binder, polyvinylidene fluoride (PVDF), was dissolved in a solvent, n-methylpyrrolidone, and then mixing the mixture until a uniform mixture was obtained. Subsequently, the paste was applied on one side of a Cu current collector, of which the thickness was 10 μm, at an application volume of 6.4 mg/cm$^2$ and then the thus-obtained workpiece was dried at 120° C., whereby an electrode was made. Subsequently, the electrode was pressed to make the density and the thickness of the paste 1.4 g/cm$^3$ and 20 μm, respectively. Then, the electrode was cut to have a diameter of 16 mm, whereby a negative electrode was obtained.

Example 3

A lithium secondary battery was made in a way the same as that of Example 2, except that acetylene black (AB) was used instead of carbon nanotubes (CNT) and the amount of AB was 20 wt % relative to the total amount (100 wt %) of Sn and AB in the process of preparing the negative electrode active material of Example 2.

Example 4

A lithium secondary battery was made in a way the same as that of Example 2, except that the amount of CNT was 0.5 wt % or 1 wt % relative to the total amount (100 wt %) of Sn and CNT in the process of preparing the negative electrode active material of Example 2.

Evaluation

The cycle characteristics of the coin cells of Examples 2 to 4 were evaluated in a way similar to that of Example 1. Table 2 shows relations between the number of cycles during which the ampere-hour capacity was maintained, and heat treatment time and the amount of CNT. The number of cycles during which the ampere-hour capacity was maintained was determined based on the point at which the rate at which the ampere-hour capacity was maintained became equal to or less than 50%. In addition, the amount of CNT and the capacity of the coin cells of Examples 2 to 4 were compared. Table 3 shows the energy densities.

TABLE 2

The number of cycles during which ampere-hour capacity is maintained

| Heat Treatment Temperature (° C.) | Example 3 | | Example 4 | Example 2 | Remark |
| --- | --- | --- | --- | --- | --- |
| | Ball Milling Time (h) | | | | |
| | 0 (AB amount 20 wt %) | 0.5 | 1 | 5 | |
| 150 | 140 | 30 | 100 | 150 | Comparative Examples |
| 350 | 200 | 150 | 160 | 220 | Examples of the Invention |
| 600 | 160 | 10 | 50 | 100 | Comparative Examples |

TABLE 3

Energy Density

| | Example 3 | Example 4 | Example 2 |
| --- | --- | --- | --- |
| CNT amount (wt %) | 0 (AB amount 20 wt %) | 0.5 | 1 | 5 |
| Battery Capacity (mAh) | 0.795 | 0.989 | 0.984 | 0.944 |

Theoretical capacity of coin cell: 0.994 mAh

The durability is improved as the amount of CNT increases. The lithium secondary battery for which firing was performed at 350° C. has the best cycle characteristics. The cycle characteristics are good even when the amount of CNT is less than half the amount of AB.

Example 5 and Comparative Examples

A lithium secondary battery was made in a way the same as that of Example 1, except that a negative electrode active material was prepared and a negative electrode was made as described below.

Preparation of Negative Electrode Active Material

After Sn powder and carbon nanotubes (CNT) (Sn: CNT=95:5 (weight ratio)) were mixed in a mortar for 30 minutes and then, the mixture was processed in a ball mill for 10 hours. Then, firing (heat treatment) was performed at 150° C. in a pure (100%) argon atmosphere. Subsequently, acetylene black (AB) was added to the thus-obtained powder so that the weight ratio becomes Sn:AB=95:5 (weight ratio), Sn:AB=90:10 (weight ratio), or Sn:AB=80:20 (weight ratio), and the mixture was mixed in a mortar and then processed in the ball mill for 15 hours. Then, firing (heat treatment) was performed at 150° C., 350° C. (Example 5), or 600° C. in a pure (100%) argon atmosphere. In this way, the negative electrode active material in which CNT and AB were fused with the surface of Sn particles was obtained.

Making of Negative Electrode

A paste was prepared by introducing 1 g of the above-described negative electrode active material into a solution in which 0.05 g of a binder, polyvinylidene fluoride (PVDF), was dissolved in a solvent, n-methylpyrrolidone, and then mixing the mixture until a uniform mixture was obtained. Subsequently, the paste was applied on one side of a Cu current collector, of which the thickness was 10 µm, at an application volume of 6.4 mg/cm$^2$ and then the thus-obtained workpiece was dried at 120° C., whereby an electrode was made. Subsequently, the electrode was pressed to make the density and the thickness of the paste 1.4 g/cm$^3$ and 20 µm, respectively. Then, the electrode was cut to have a diameter of 16 mm, whereby a negative electrode was obtained.

Example 6

A lithium secondary battery was made in a way the same as that of Example 5, except that only carbon nanotubes (CNT) were mixed into Sn powder and no acetylene black (AB) was mixed thereinto in the process of preparing the negative electrode active material of Example 5.

Evaluation

The cycle characteristics of the coin cells of Examples 5 and 6 were evaluated in a way similar to that of Example 1. Table 4 shows relations between the number of cycles during which the ampere-hour capacity is maintained, and heat treatment temperature and the amount of AB. The number of cycles during which the ampere-hour capacity is maintained is determined based on the point at which the rate at which the ampere-hour capacity is maintained becomes equal to or less than 50%.

TABLE 4

The number of cycles during which ampere-hour capacity is maintained

| Heat Treatment Temperature (° C.) | Example 6 | Example 5 AB amount (wt %) | | | Remark |
|---|---|---|---|---|---|
| | 0 | 5 | 10 | 20 | |
| 150 | 150 | 130 | 150 | 160 | Comparative Examples |
| 350 | 220 | 160 | 270 | 200 | Examples of the Invention |
| 600 | 100 | 120 | 150 | 170 | Comparative Examples |

The lithium secondary battery for which the amount of AB was 10 wt % and firing was performed at 350° C. has the best cycle characteristics. It is considered that this is because when the amount of AB is greater than 10 wt %, CNT is buried under AB and sufficient electrically conductive paths cannot be obtained. At a high temperature of 600° C., the greater the amount of AB is, the better cycle characteristics the negative electrode active material shows. It is considered that this is because when the amount of AB increases, the amount of Sn that is covered with AB increases and therefore, Sn is prevented from forming bulk lumps after Sn is melted.

The invention claimed is:

1. A negative electrode active material comprising:
   a tin particle consisting essentially of tin and carbonaceous matter consisting essentially of carbon that adheres to a surface of the tin particle, with a mixture phase, in which tin and carbon are mixed, interposed between the carbonaceous matter and the tin particle,
   wherein:
   the carbonaceous matter is particulate carbonaceous matter in which an aspect ratio of primary particles is equal to or greater than 1 and less than 100, and fibrous carbonaceous matter in which an aspect ratio of primary particles is equal to or greater than 100;
   part of the surface of the tin particle is covered with the fibrous carbonaceous matter; and
   an entire remaining surface of the tin particle is covered with the particulate carbonaceous matter.

2. The negative electrode active material according to claim 1, wherein a weight ratio of the fibrous carbonaceous matter to the particulate carbonaceous matter is within a range of 0.01 to 100.

3. The negative electrode active material according to claim 2, wherein a weight ratio of the fibrous carbonaceous matter to the particulate carbonaceous matter is within a range of 0.1 to 10.

4. The negative electrode active material according to claim 1, wherein a thickness of the particulate carbonaceous matter that covers the tin particle is within a range of 1 nm to 1000 nm.

5. The negative electrode active material according to claim 4, wherein the thickness of the particulate carbonaceous matter that covers the tin particle is within a range of 5 nm to 100 nm.

6. A method of manufacturing a negative electrode active material, comprising:
   mixing tin particles consisting essentially of tin with fibrous carbonaceous matter, in which an aspect ratio of primary particles of the fibrous carbonaceous material is equal to or greater than 100;
   mixing a mixture of the tin particles and the fibrous carbonaceous matter with particulate carbonaceous matter consisting essentially of carbon, in which an aspect ratio of primary particles of the particulate carbonaceous material is equal to or greater than 1 and less than 100; and
   performing heat treatment at a temperature equal to or higher than a melting point of tin and equal to or lower than 450° C., thereby causing the fibrous carbonaceous matter and the particulate carbonaceous matter to adhere to surfaces of the tin particles.

7. The method of manufacturing a negative electrode active material according to claim 6, wherein the mixture and the carbonaceous matter are mixed with the use of a ball mill for 0.5 hour or more.

8. The method of manufacturing a negative electrode active material according to claim 7, wherein the mixture and the carbonaceous matter are mixed with the use of the ball mill for a time period within a range of about 1 hour to about 30 hours.

9. The method of manufacturing a negative electrode active material according to claim 6, wherein the tin particles and the fibrous carbonaceous matter are mixed with the use of a ball mill for 0.5 hour or more.

10. The method of manufacturing a negative electrode active material according to claim 9, wherein the tin particles and the fibrous carbonaceous matter are mixed with the use of the ball mill for a time period within a range of about 1 hour to about 30 hours.

11. A lithium secondary battery that has a negative electrode including the negative electrode active material according to claim 1.

* * * * *